(12) United States Patent
Kobayashi (10) Patent No.: US 12,319,374 B2
(45) Date of Patent: Jun. 3, 2025

(54) DEVICE ATTACHMENT STRUCTURE

(71) Applicant: SUBARU CORPORATION, Tokyo (JP)

(72) Inventor: Nobuaki Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 333 days.

(21) Appl. No.: 17/971,850

(22) Filed: Oct. 24, 2022

(65) Prior Publication Data

US 2023/0146854 A1 May 11, 2023

(30) Foreign Application Priority Data

Nov. 8, 2021 (JP) ................................. 2021-181885

(51) Int. Cl.
  B62D 65/02 (2006.01)
(52) U.S. Cl.
  CPC .................................. B62D 65/024 (2013.01)
(58) Field of Classification Search
  CPC ........ B62D 27/04; B62D 27/06; B62D 21/11; B60K 1/00; B60K 2001/001
  USPC .......................... 248/637, 674; 403/220, 221
  See application file for complete search history.

(56) References Cited

U.S. PATENT DOCUMENTS

| | | | | |
|---|---|---|---|---|
| 3,663,002 | A * | 5/1972 | Gergle ..................... | F16F 7/108 267/141.1 |
| 3,880,444 | A * | 4/1975 | Bridges .................. | B62D 17/00 280/86.753 |
| 11,845,490 | B1 * | 12/2023 | Shroyer ................. | B62D 17/00 |
| 11,919,116 | B1 * | 3/2024 | Paine ...................... | B63B 73/30 |
| 2005/0133325 | A1 * | 6/2005 | Kuwayama ............ | F16F 7/108 188/379 |
| 2015/0176672 | A1 * | 6/2015 | Rehwald ................ | F02M 61/14 403/221 |
| 2019/0092398 | A1 * | 3/2019 | Arisa Busquets .... | F16B 33/004 |
| 2023/0146854 | A1 * | 5/2023 | Kobayashi ............ | B62D 27/04 296/1.07 |
| 2023/0406091 | A1 * | 12/2023 | Igashira ................. | B60K 11/04 |
| 2024/0109597 | A1 * | 4/2024 | Peron ................... | B62D 25/085 |

FOREIGN PATENT DOCUMENTS

| | | |
|---|---|---|
| JP | 2013-086681 A | 5/2013 |
| JP | 2016-049862 A | 4/2016 |
| JP | 2020-147207 A | 9/2020 |

* cited by examiner

*Primary Examiner* — Muhammad Ijaz
(74) *Attorney, Agent, or Firm* — MCGINN I.P. LAW GROUP, PLLC (57) ABSTRACT

A device attachment structure includes a vehicle member having first and second threads, a device member including first and second through holes, first and second bushings respectively including first and second outer sleeves and first and second inner sleeves, and first and second fasteners. The device member includes a first surface and a second surface that is opposite to the first surface. The first through hole has a large-diameter space that opens in the first surface and to which the first outer sleeve is fitted and a small-diameter space that opens in the second surface and through which the first inner sleeve passes. The second through hole has a large-diameter space that opens in the second surface and to which the second outer sleeve is fitted and a small-diameter space that opens in the first surface and through which the second inner sleeve passes.

20 Claims, 13 Drawing Sheets

DEVICE ATTACHMENT STRUCTURE

CROSS-REFERENCE TO RELATED APPLICATIONS

The present application claims priority from Japanese Patent Application No. 2021-181885 filed on Nov. 8, 2021, the entire contents of which are hereby incorporated by reference.

BACKGROUND

The disclosure relates to a device attachment structure for attaching a power conversion device to a vehicle.

Power conversion devices, such as inverters, converters, and on-board chargers, are mounted in vehicles such as electric automobiles and hybrid automobiles (see Japanese Unexamined Patent Application Publications Nos. 2020-147207, 2016-49862, and 2013-86681). To reduce transmission of vibration from a power conversion device, such as an inverter, to a vehicle body, for example, a rubber bushing or the like is used to attach the power conversion device to a vehicle.

SUMMARY

An aspect of the disclosure provides a device attachment structure for attaching a power conversion device to a vehicle. The device attachment structure includes a vehicle member, a device member, a first bushing, a second bushing, a first fastener, and a second fastener. The vehicle member is provided on the vehicle and includes a first thread and a second thread. The device member is provided on the power conversion device and has a first through hole and a second through hole. The first bushing includes a first outer sleeve and a first inner sleeve. The first outer sleeve is fitted to the first through hole. The first inner sleeve is coupled to an inner periphery of the first outer sleeve with an elastic body provided between the first inner sleeve and the first outer sleeve. The second bushing includes a second outer sleeve and a second inner sleeve. The second outer sleeve is fitted to the second through hole. The second inner sleeve is coupled to an inner periphery of the second outer sleeve with an elastic body provided between the second inner sleeve and the second outer sleeve. The first fastener is attached to the first thread of the vehicle member and configured to fasten the first inner sleeve to the vehicle member. The second fastener is attached to the second thread of the vehicle member and configured to fasten the second inner sleeve to the vehicle member. The device member has a first surface that faces the vehicle member and a second surface that is opposite to the first surface. The first through hole in the device member has a large-diameter space that opens in the first surface and to which the first outer sleeve is fitted and a small-diameter space that opens in the second surface and through which the first inner sleeve passes. The second through hole in the device member has a large-diameter space that opens in the second surface and to which the second outer sleeve is fitted and a small-diameter space that opens in the first surface and through which the second inner sleeve passes.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

A power conversion device, such as an inverter, is heavy. Therefore, even when an attachment structure including a rubber bushing or the like is employed, the power conversion device is to be appropriately attached to a vehicle. In other words, the power conversion device is to be appropriately attached to the vehicle so that the power conversion device does not fall off the vehicle when a large force is applied thereto in case of, for example, a vehicle collision.

It is desirable to appropriately attach a power conversion device to a vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle Structure

Figure 1:
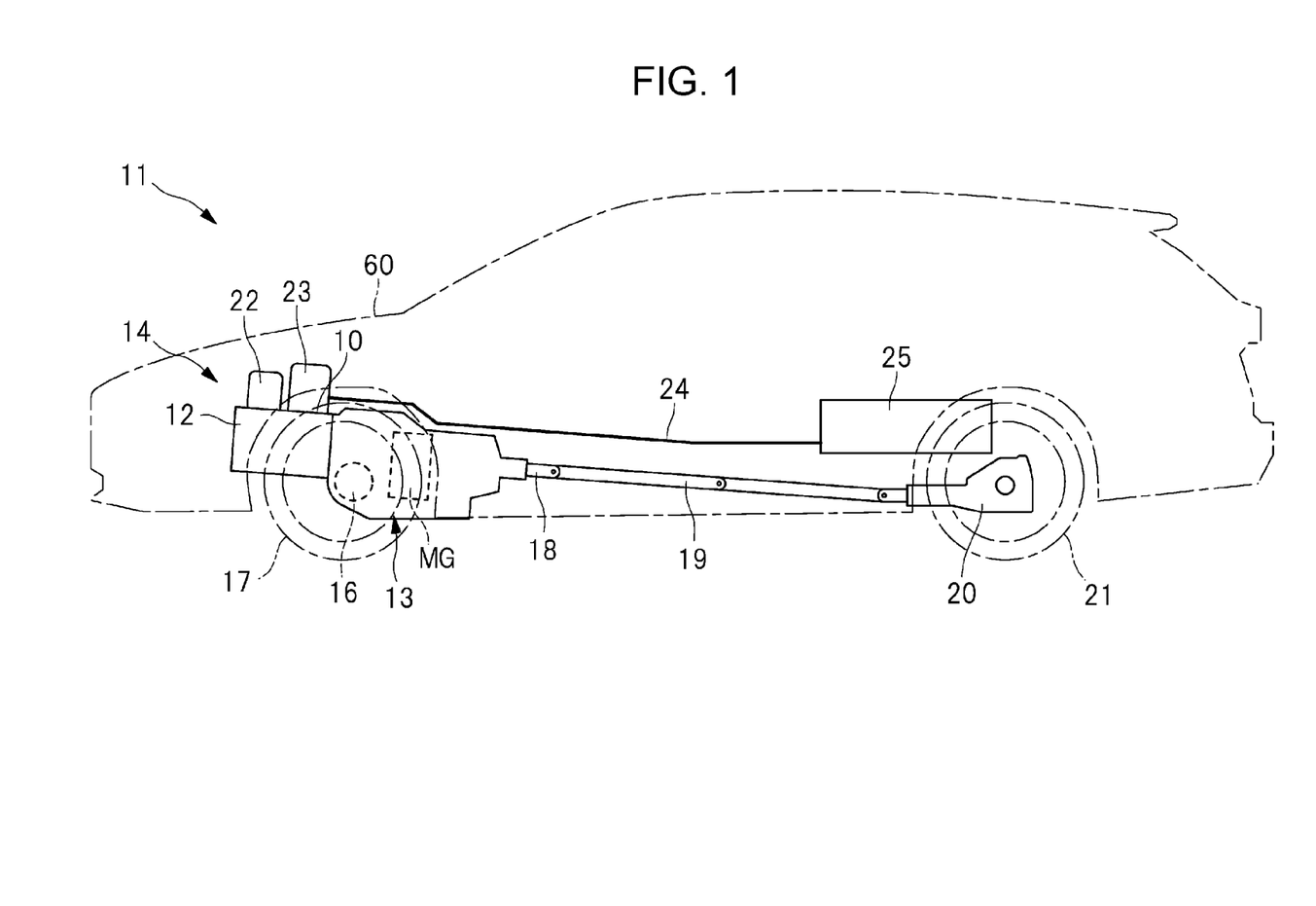
FIG. 1 illustrates an example of a hybrid vehicle including a device attachment structure according to an embodiment of the disclosure.

FIG. 1 illustrates an example of a hybrid vehicle 11 including a device attachment structure 10 according to an embodiment of the disclosure. As illustrated in FIG. 1, the hybrid vehicle (vehicle) 11 includes a power train 14 including an engine 12 and a transmission 13. The transmission 13 includes a motor generator MG and a front differential mechanism 16. Front wheels 17 are coupled to the engine 12 and the motor generator MG by the front differential mechanism 16. Rear wheels 21 are coupled to the engine 12 and the motor generator MG by a rear-wheel output shaft 18, a propeller shaft 19, and a rear differential mechanism 20. The illustrated vehicle 11 is an all-wheel-drive vehicle. However, the vehicle 11 is not limited to this, and may be a front-wheel-drive vehicle or a rear-wheel-drive vehicle.

An intake manifold 22 that guides intake air is attached to the top of the engine 12. A power conversion unit 23, which serves as a power conversion device, is also attached to the top of the engine 12 at a position behind the intake manifold 22. A battery 25, such as a lithium ion battery, is coupled to the power conversion unit 23 by an electric power cable 24. The power conversion unit 23 includes an inverter (not illustrated) that controls the state of energization of the motor generator MG and a boost converter (not illustrated) that boosts direct current power supplied from the battery 25. When the motor generator MG is set to a power running state, the power conversion unit 23 converts direct current power supplied from the battery 25 into alternating current power, which is supplied to the motor generator MG. When the motor generator MG is set to a power generating state, the power conversion unit 23 converts alternating current power supplied from the motor generator MG into direct current power, which is supplied to the battery 25.

Device Attachment Structure

Figure 2:
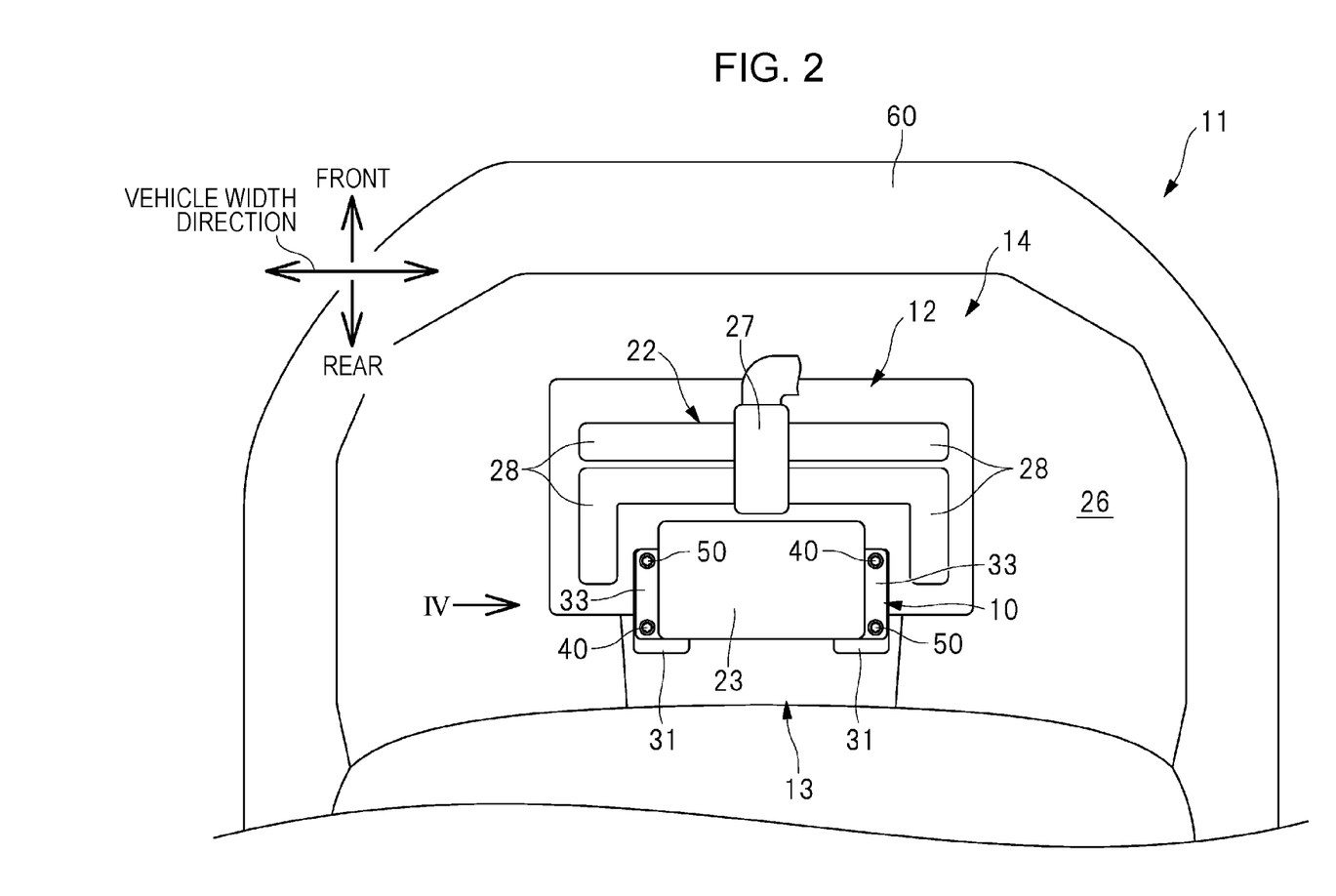
FIG. 2 is a top view of a power train disposed in an engine room.
Figure 3:
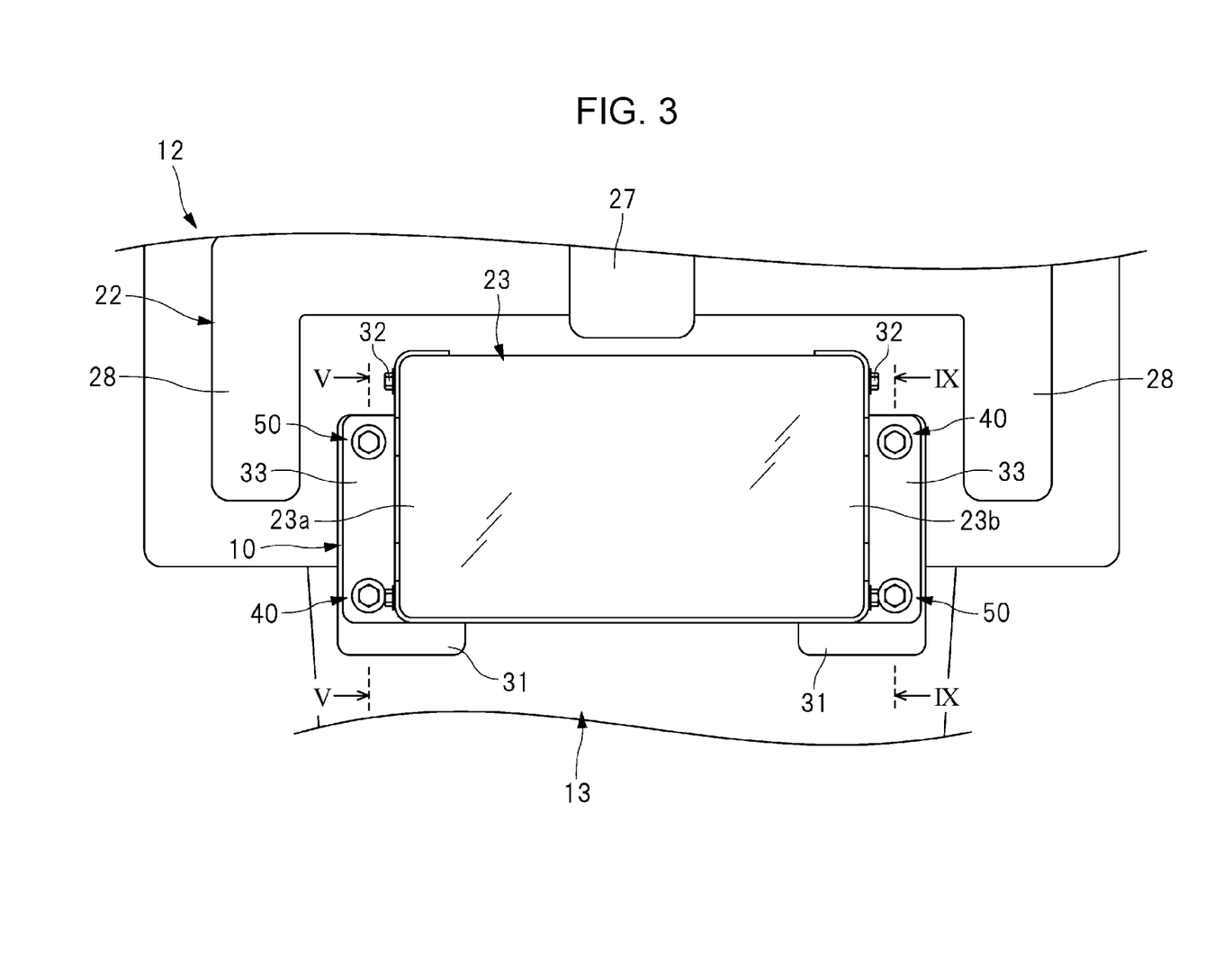
FIG. 3 is an enlarged view of a power conversion unit illustrated in FIG. 2 and a region around the power conversion unit.
Figure 4:
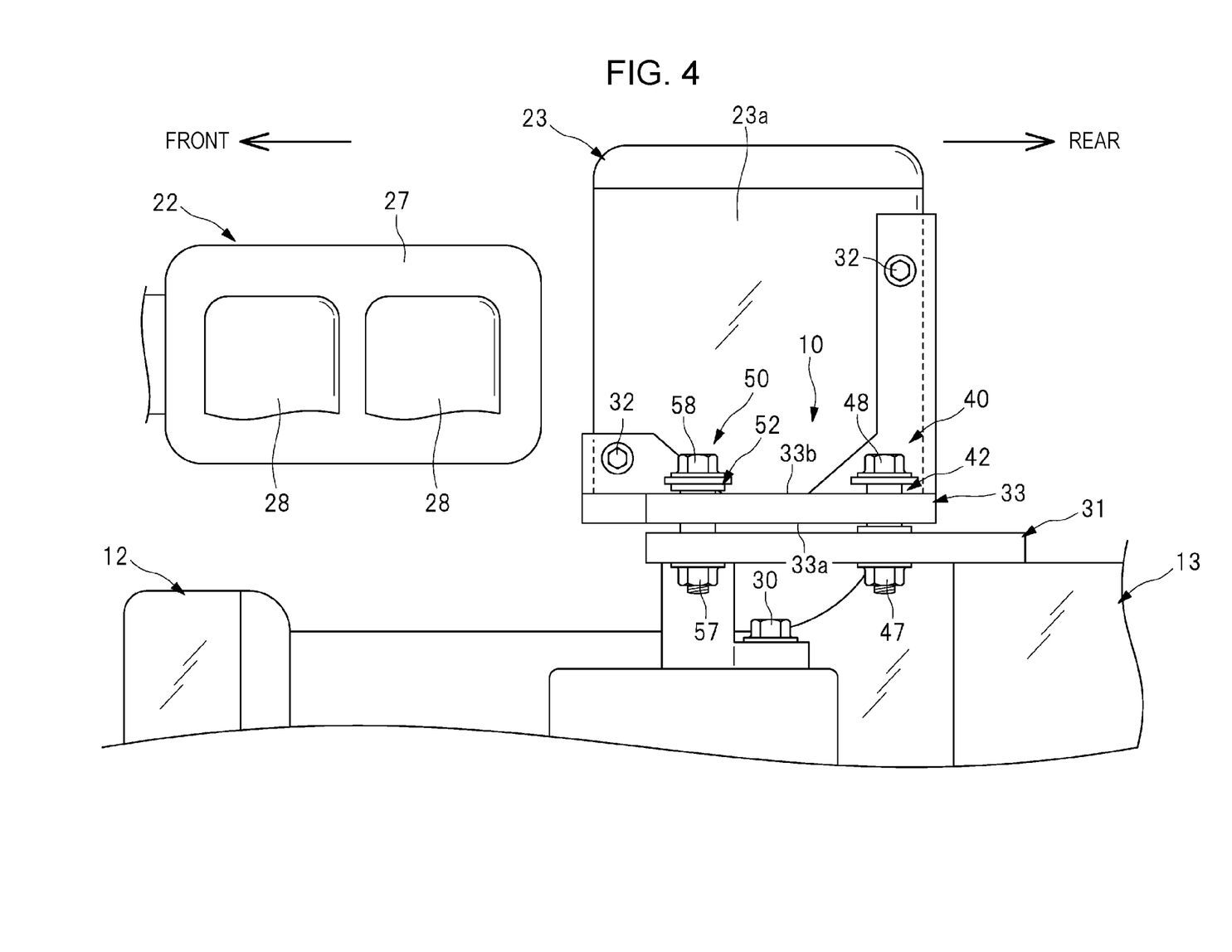
FIG. 4 illustrates the power conversion unit and the region around the power conversion unit viewed in a direction of arrow IV in FIG. 2.

An attachment structure (device attachment structure) 10 used to attach the power conversion unit 23 to the engine 12 will now be described. FIG. 2 is a top view of the power train 14 disposed in an engine room 26. FIG. 3 is an enlarged view of the power conversion unit 23 illustrated in FIG. 2 and a region around the power conversion unit 23. FIG. 4 illustrates the power conversion unit 23 and the region around the power conversion unit 23 viewed in a direction of arrow IV in FIG. 2.

As illustrated in FIG. 2, the intake manifold 22 and the power conversion unit 23 are attached to the top of the engine 12. The intake manifold 22 includes a surge tank 27. The surge tank 27 is disposed in front of the power conversion unit 23. Four branches 28 extend from the surge tank 27 of the intake manifold 22, and some of the branches 28 are disposed near both ends 23a and 23b of the power conversion unit 23. As illustrated in FIGS. 3 and 4, an engine bracket (vehicle member) 31 is attached to the engine 12 mounted in the vehicle 11 with, for example, fastening bolts 30. A device bracket (device member) 33 is attached to the power conversion unit 23 with, for example, fastening bolts 32. The engine bracket 31 and the device bracket 33 are fastened together by using four attachment mechanisms 40 and 50 described below. Thus, the illustrated power conversion unit 23 is attached to the vehicle 11 by using the four attachment mechanisms 40 and 50.

Figure 5:
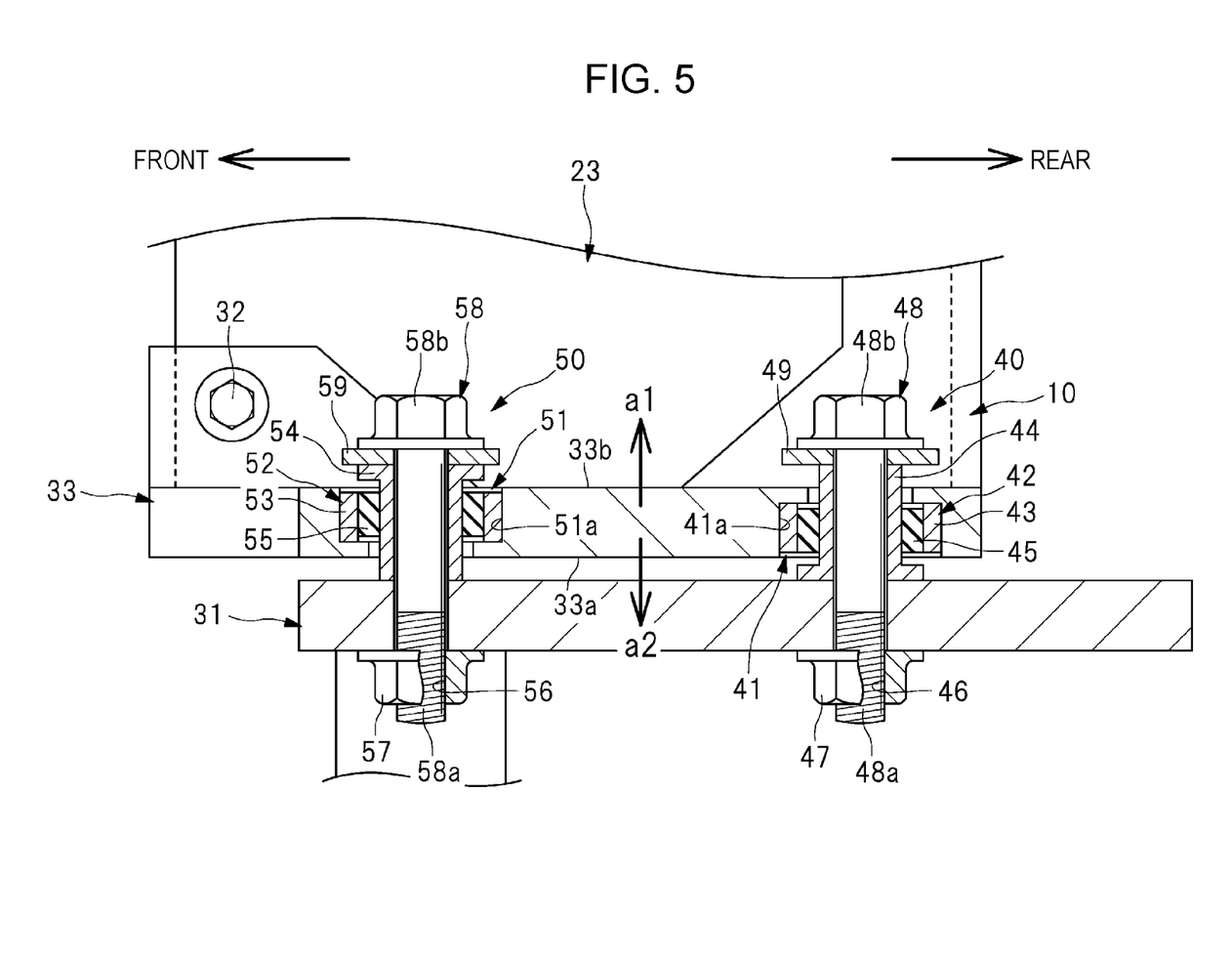
FIG. 5 is a sectional view of attachment mechanisms taken along line V-V in FIG. 3.
Figure 6:
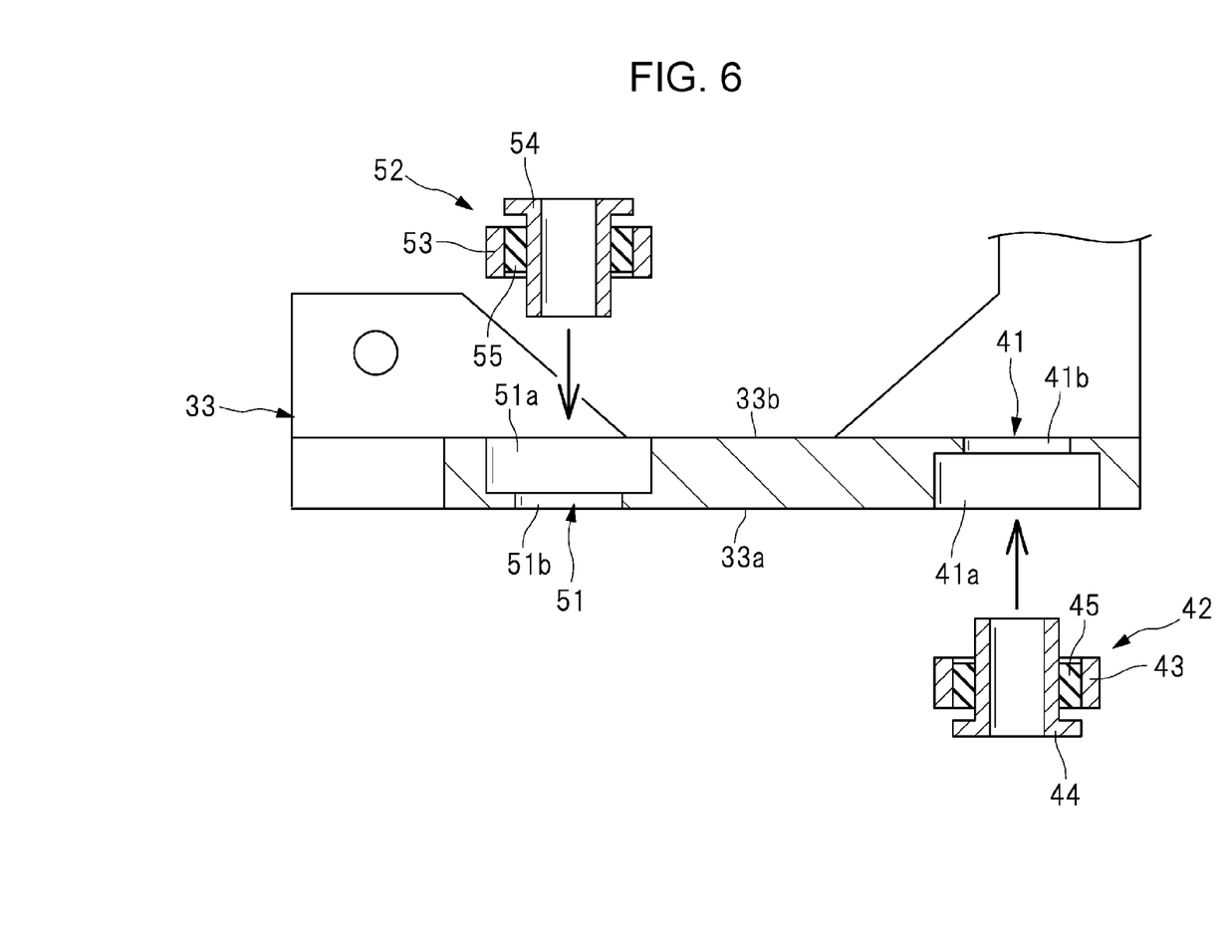
FIG. 6 illustrates a procedure for attaching the power conversion unit to an engine bracket.
Figure 7:
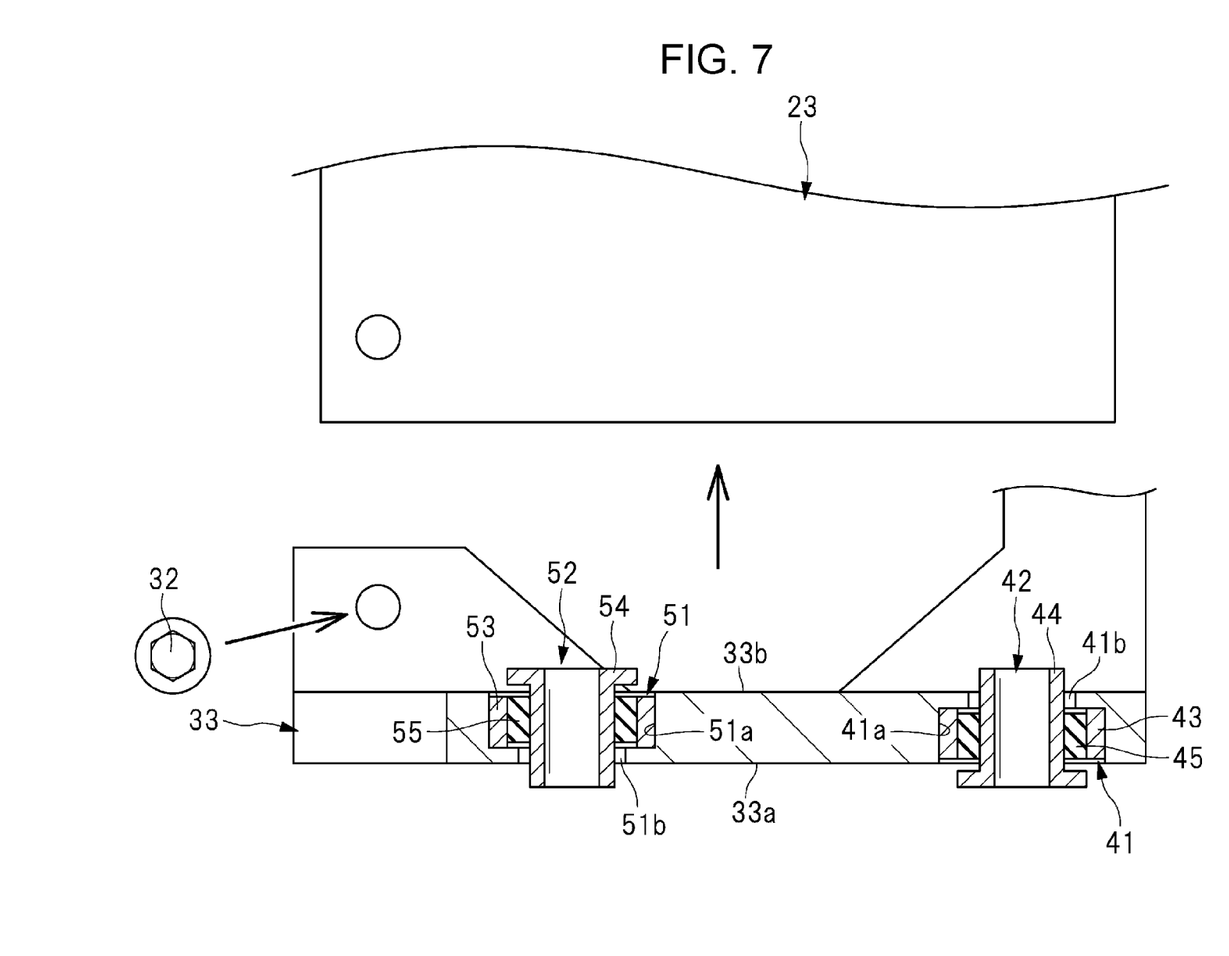
FIG. 7 illustrates the procedure for attaching the power conversion unit to the engine bracket.
Figure 8:
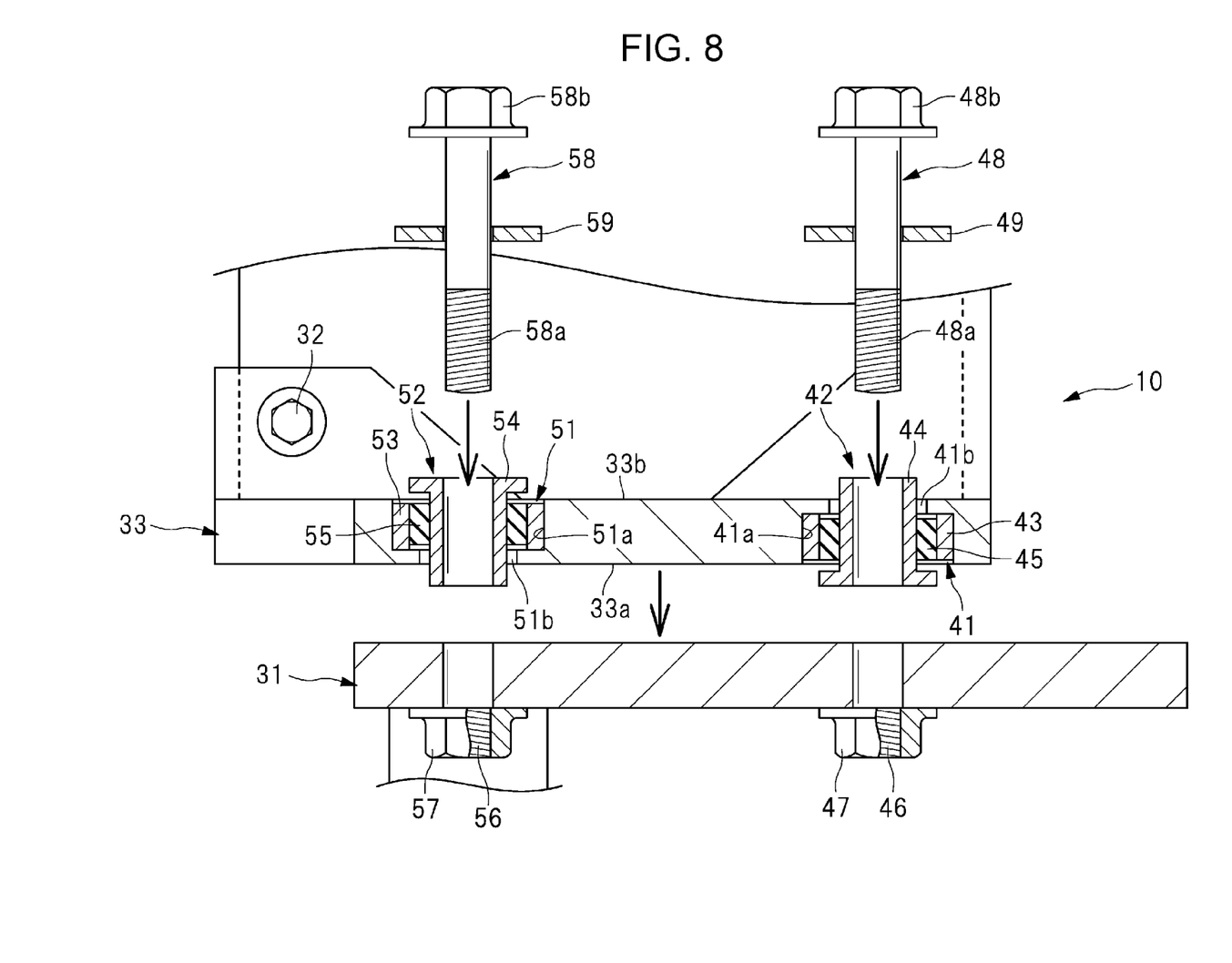
FIG. 8 illustrates the procedure for attaching the power conversion unit to the engine bracket.

FIG. 5 is a sectional view of the attachment mechanisms 40 and 50 taken along line V-V in FIG. 3. FIGS. 6 to 8 illustrate a procedure for attaching the power conversion unit 23 to the engine bracket 31. As illustrated in FIG. 6, the device bracket 33 has a first through hole 41 and a second through hole 51 that extend through the device bracket 33 in a thickness direction. The first through hole 41 includes a large-diameter space 41a that opens in a lower surface (first surface) 33a of the device bracket 33 and a small-diameter space 41b that opens in an upper surface (second surface) 33b of the device bracket 33. The second through hole 51 includes a large-diameter space 51a that opens in the upper surface 33b of the device bracket 33 and a small-diameter space 51b that opens in the lower surface 33a of the device bracket 33. As illustrated in FIG. 5, the lower surface 33a of the device bracket 33 is a surface facing the engine bracket 31, and the upper surface 33b of the device bracket 33 is a surface that is opposite to the lower surface 33a.

As illustrated in FIG. 6, a first bushing 42 is press-fitted into the first through hole 41 in the device bracket 33 from below. The first bushing 42 includes a first outer sleeve 43, a first inner sleeve 44 disposed inside the first outer sleeve 43, and an elastic body 45 made of rubber that couples the first outer sleeve 43 and the first inner sleeve 44. As illustrated in FIG. 7, the first outer sleeve 43 is fitted to the large-diameter space 41a, and the first inner sleeve 44 passes through the small-diameter space 41b. As illustrated in FIG. 6, a second bushing 52 is press-fitted into the second through hole 51 in the device bracket 33 from below. The second bushing 52 includes a second outer sleeve 53, a second inner sleeve 54 disposed inside the second outer sleeve 53, and an elastic body 55 made of rubber that couples the second outer sleeve 53 and the second inner sleeve 54. As illustrated in FIG. 7, the second outer sleeve 53 is fitted to the large-diameter space 51a, and the second inner sleeve 54 passes through the small-diameter space 51b. After the first bushing 42 and the second bushing 52 are attached to the device bracket 33 in this manner, the device bracket 33 is fixed to the power conversion unit 23 by using the fastening bolts 32, as illustrated in FIG. 7.

As illustrated in FIG. 8, a nut 47 having an internal thread (first thread) 46 and a nut 57 having an internal thread (second thread) 56 are welded to the engine bracket 31 attached to the engine 12. Since the nuts 47 and 57 are fixed to the engine bracket 31 by welding, the engine bracket 31 is provided with the internal threads 46 and 56. The device bracket 33 of the power conversion unit 23 is placed on the engine bracket 31 such that the first through hole 41 faces the internal thread 46 and that the second through hole 51 faces the internal thread 56.

Then, a first fastening bolt (first fastener, bolt) 48 is inserted through the first inner sleeve 44 from above, and an external thread 48a of the first fastening bolt 48 is screwed into the internal thread 46. Thus, the first inner sleeve 44 of the first bushing 42 is fastened to the engine bracket 31 by the first fastening bolt 48. Similarly, a second fastening bolt (second fastener, bolt) 58 is inserted through the second inner sleeve 54 from above, and an external thread 58a of the second fastening bolt 58 is screwed into the internal thread 56. Thus, the second inner sleeve 54 of the second bushing 52 is fastened to the engine bracket 31 by the second fastening bolt 58. A first washer 49 is provided between a head 48b of the first fastening bolt 48 and the first inner sleeve 44. A second washer 59 is provided between a head 58b of the second fastening bolt 58 and the second inner sleeve 54.

Figure 9:
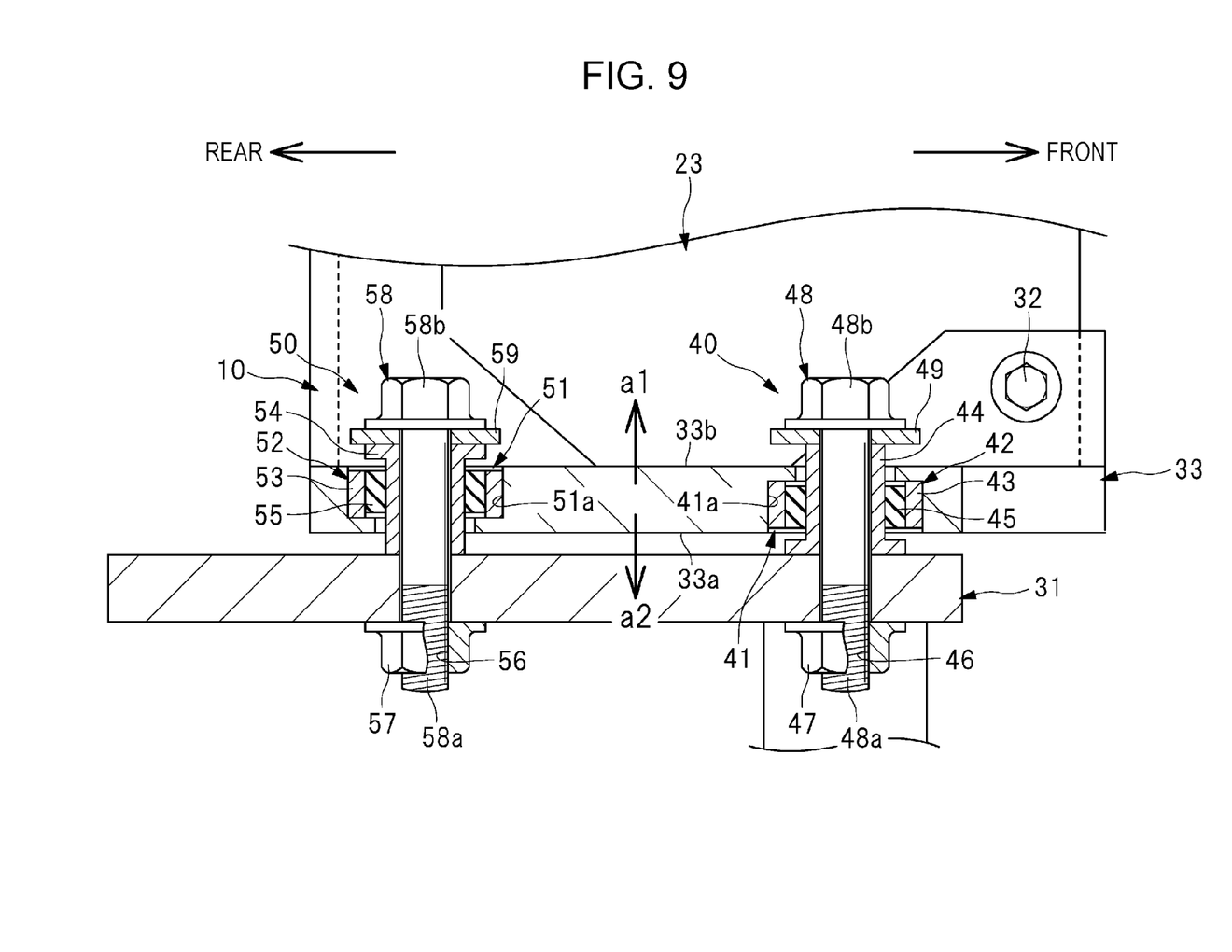
FIG. 9 is a sectional view of attachment mechanisms taken along line IX-IX in FIG. 3.

Thus, one end 23a of the power conversion unit 23 in a vehicle width direction is supported by the first attachment mechanism 40 constituted by the internal thread 46, the first through hole 41, the first bushing 42, and the first fastening bolt 48, and is also supported by the second attachment mechanism 50 constituted by the internal thread 56, the second through hole 51, the second bushing 52, and the second fastening bolt 58. In a region near the end 23a of the power conversion unit 23, the first attachment mechanism 40 is disposed closer to the rear of the vehicle than the second attachment mechanism 50. FIG. 9 is a sectional view of the attachment mechanisms 40 and 50 taken along line IX-IX in FIG. 3. As illustrated in FIG. 9, the other end 23b of the power conversion unit 23 in the vehicle width direction is also supported by the first attachment mechanism 40 constituted by the internal thread 46, the first through hole 41, the first bushing 42, and the first fastening bolt 48 and by the second attachment mechanism 50 constituted by the internal thread 56, the second through hole 51, the second bushing 52, and the second fastening bolt 58. In a region near the end 23b of the power conversion unit 23, the first attachment mechanism 40 is disposed closer to the front of the vehicle than the second attachment mechanism 50.

As described above, the engine bracket 31 provided on the vehicle 11 and the device bracket 33 provided on the power conversion unit 23 are coupled to each other by the four attachment mechanisms 40 and 50. In other words, the engine bracket 31 and the device bracket 33 are coupled to each other with the elastic bodies 45 and 55 of the first and second bushings 42 and 52 provided therebetween. When the elastic bodies 45 and 55 are provided between the engine 12 and the power conversion unit 23, transmission of vibration between the engine 12 and the power conversion unit 23 can be reduced. Accordingly, noise and vibration transmitted from the power conversion unit 23 to, for example, a vehicle body 60 through the engine 12 can be reduced. In addition, the power conversion unit 23 can be protected from engine vibration.

The device bracket 33 can be attached to the engine bracket 31 by screwing the fastening bolts 48 and 58 from above the device bracket 33. In addition, the device bracket 33 can be removed from the engine bracket 31 by loosening the fastening bolts 48 and 58 from above the device bracket 33. Accordingly, the device bracket 33 can be easily attached to and removed from the engine bracket 31 by an operator. Thus, attachment and removal of the power conversion unit 23 to and from the engine room 26 can be facilitated. As illustrated in FIG. 2, the branches 28 of the intake manifold 22 are disposed near the ends 23a and 23b of the power conversion unit 23. Therefore, it is difficult to bring a tool closer to the power conversion unit 23 in the vehicle width direction. Since the fastening bolts 48 and 58 are attached and removed from above the device bracket 33 as described above, the power conversion unit 23 can be very easily attached or removed.

Prevention of Falling of Power Conversion Unit

As described above, the first bushing 42 and the second bushing 52 are press-fitted to the device bracket 33 of the power conversion unit 23. Thus, the device bracket 33 is retained by the fitting force of the first outer sleeve 43 and the second outer sleeve 53. Even when a large force is applied to the device bracket 33 in case of, for example, a vehicle collision, falling of the device bracket 33, that is, falling of the power conversion unit 23, is to be prevented. Accordingly, in the device attachment structure 10 of the present embodiment, the first bushing 42 is press-fitted through the lower surface 33a of the device bracket 33, and the second bushing 52 is press-fitted through the upper surface 33b of the device bracket 33. Thus, the direction in which the first bushing 42 is pulled out and the direction in which the second bushing 52 is pulled out differ from each other, so that the first bushing 42 and the second bushing 52 can be prevented from falling together.

When the device bracket 33 is pushed upward as indicated by arrow a1 in FIGS. 5 and 9 by an input in a vehicle collision, the second bushing 52 is not pulled out of the device bracket 33 and remains fitted to the device bracket 33. When the device bracket 33 is pushed downward as indicated by arrow a2 in FIGS. 5 and 9 by an input in a vehicle collision, the first bushing 42 is not pulled out of the device bracket 33 and remains fitted to the device bracket 33. Therefore, even when the power conversion unit 23 is violently shaken by inertial force in a vehicle collision, the first bushing 42 and the second bushing 52 do not fall off the device bracket 33 together. Accordingly, falling of the device bracket 33, that is, falling of the power conversion unit 23, can be prevented.

Figure 10:
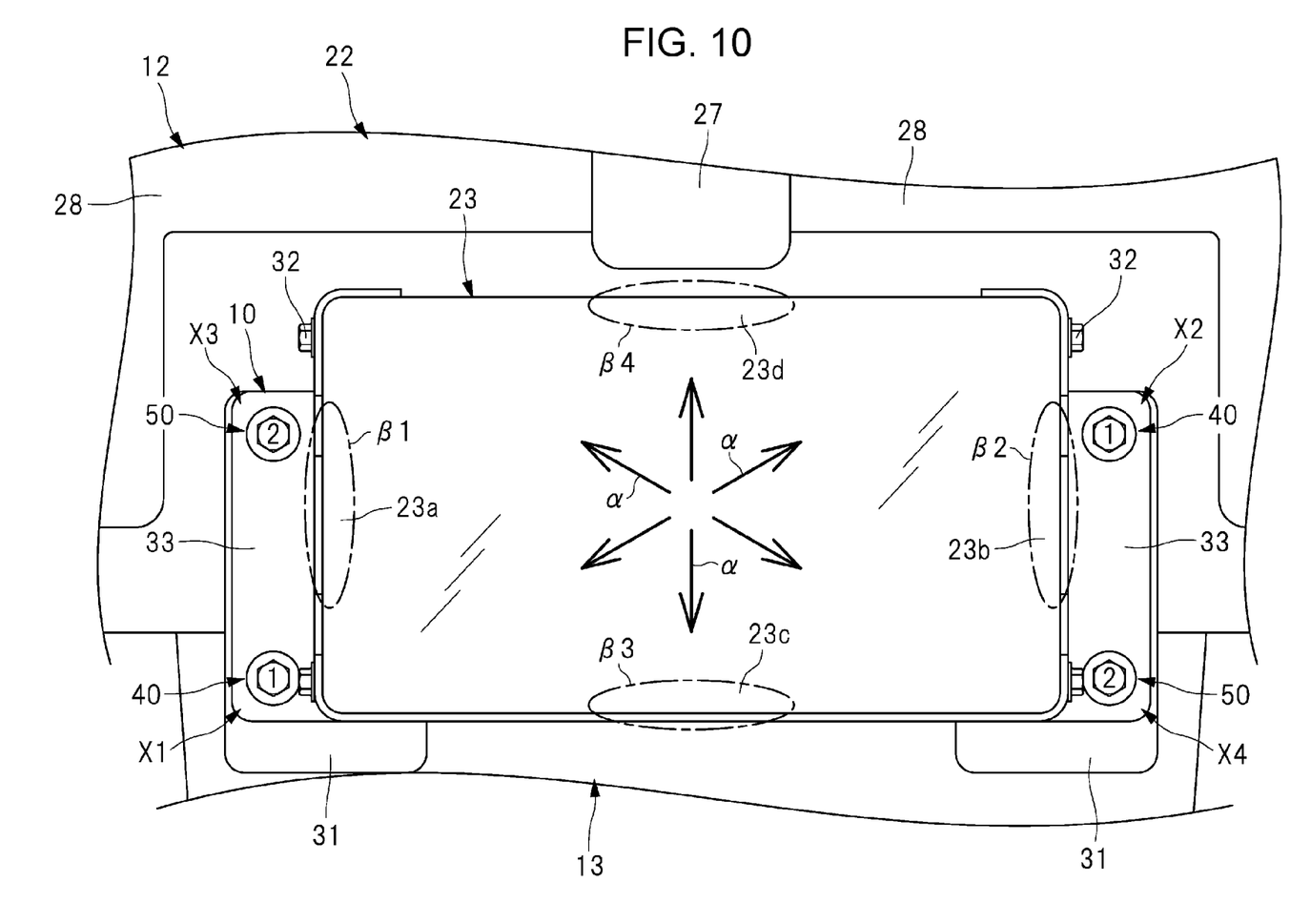
FIG. 10 illustrates positions of the attachment mechanisms with which the power conversion unit is attached to an engine.

FIG. 10 illustrates the positions of the attachment mechanisms with which the power conversion unit 23 is attached to the engine 12. In FIG. 10, bolt heads of the first attachment mechanisms 40 which each include the first bushing 42 are marked "1", and bolt heads of the second attachment mechanisms 50 which each include the second bushing 52 are marked "2". As illustrated in FIG. 10, the engine bracket 31 and the device bracket 33 include a first corner X1 and a second corner X2 on one diagonal, and a third corner X3 and a fourth corner X4 on the other diagonal. The first attachment mechanisms 40 which each include the first bushing 42 are provided at the first corner X1 and the second corner X2. The second attachment mechanisms 50 which each include the second bushing 52 are provided at the third corner X3 and the fourth corner X4. In other words, the two first attachment mechanisms 40 are disposed at one pair of diagonal corners, and the two second attachment mechanisms 50 are disposed at other pair of diagonal corners.

When the first attachment mechanisms 40 and the second attachment mechanisms 50 are disposed as described above, the first bushings 42 and the second bushings 52 can be prevented from falling off the device bracket 33 even when force is applied to the power conversion unit 23 in various directions as indicated by arrows α. Accordingly, falling of the device bracket 33, that is, falling of the power conversion unit 23, can be prevented. In other words, the first bushings 42 and the second bushings 52 can be prevented from falling off the device bracket 33 both when the ends 23a and 23b of the power conversion unit 23 in the vehicle width direction move vertically as indicated by signs β1 and β2 and when ends 23c and 23d of the power conversion unit 23 in a front-rear direction move vertically as indicated by signs β3 and β4. Accordingly, falling of the device bracket 33, that is, falling of the power conversion unit 23, can be prevented.

As described above, the first washer 49 is provided between the head 48b of the first fastening bolt 48 and the first inner sleeve 44, and the second washer 59 is provided between the head 58b of the second fastening bolt 58 and the second inner sleeve 54. Therefore, when the first fastening bolt 48 is fastened, rotational force transmitted from the first fastening bolt 48 to the first outer sleeve 43 through the first inner sleeve 44 can be reduced, so that loosening of the first outer sleeve 43 that is fitted can be prevented. Similarly, when the second fastening bolt 58 is fastened, rotational force transmitted from the second fastening bolt 58 to the second outer sleeve 53 through the second inner sleeve 54 can be reduced, so that loosening of the second outer sleeve 53 that is fitted can be prevented. This also contributes to prevention of falling of the first and second bushings 42 and 52.

Another Embodiment 1

According to the above description, two first attachment mechanisms 40 and two second attachment mechanisms 50 are used to attach the power conversion unit 23 to the engine 12. However, the structure is not limited to this. The power conversion unit 23 may be attached to the engine 12 by using one first attachment mechanism 40 and one second attachment mechanism 50. Alternatively, the power conversion unit 23 may be attached to the engine 12 by using one first attachment mechanism 40 and more than one second attachment mechanisms 50, or by using more than one first attachment mechanisms 40 and one second attachment mechanism 50. Alternatively, the power conversion unit 23 may be attached to the engine 12 by using more than one first attachment mechanisms 40 and more than one second attachment mechanisms 50.

Figure 11:
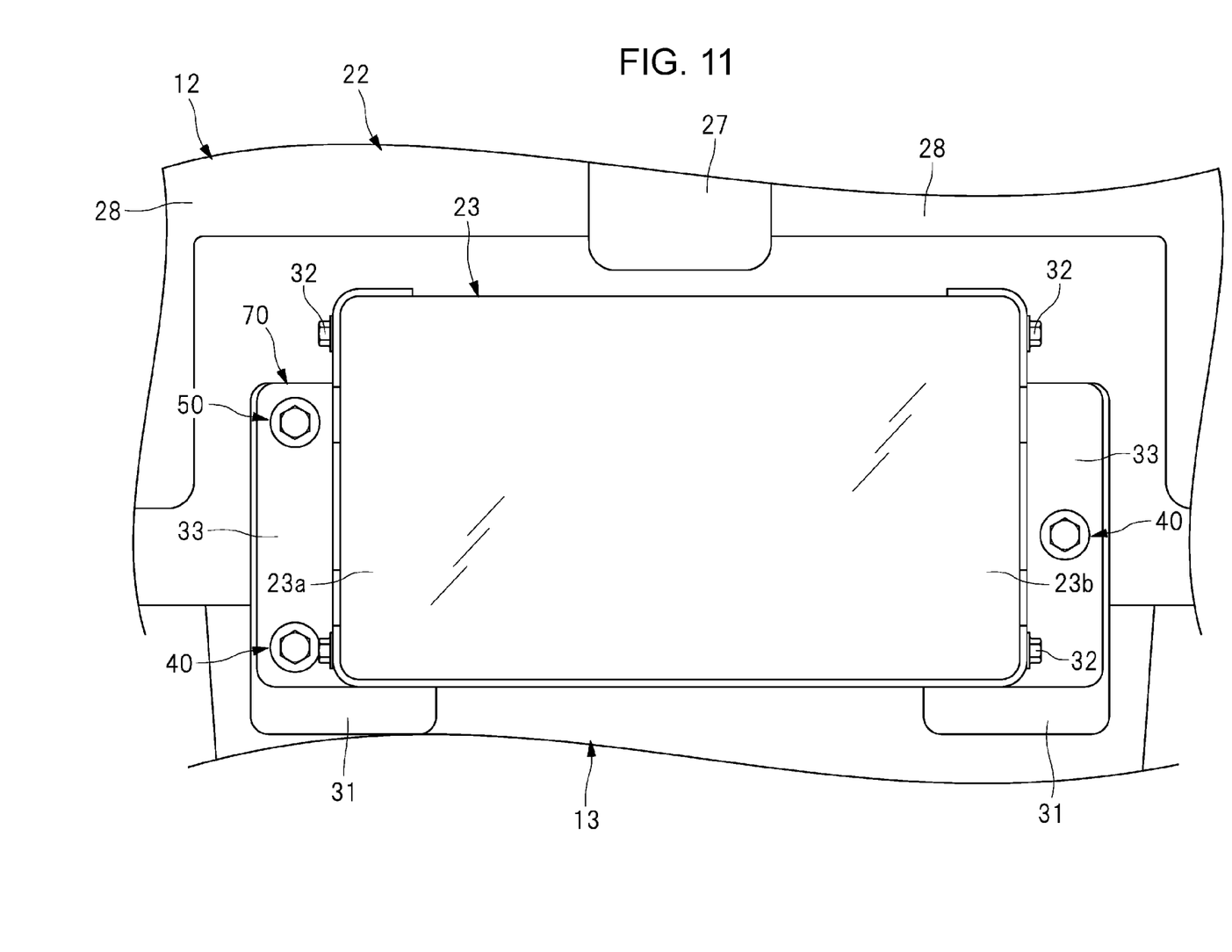
FIG. 11 illustrates a device attachment structure according to another embodiment of the disclosure.

FIG. 11 illustrates a device attachment structure 70 according to another embodiment of the disclosure. As illustrated in FIG. 11, a first attachment mechanism 40 and a second attachment mechanism 50 are provided at one end 23a of a power conversion unit 23 in a vehicle width direction. Another first attachment mechanism 40 is provided at the other end 23b of the power conversion unit 23 in the vehicle width direction. Also, when a device bracket 33 is attached by using two first attachment mechanisms 40 and one second attachment mechanism 50 as in this example, first bushings 42 and a second bushing 52 can be prevented from falling off a device bracket 33 together. Accordingly, falling of the device bracket 33, that is, falling of the power conversion unit 23, can be prevented. Here, the device bracket 33 may instead be attached by using one first attachment mechanism 40 and two second attachment mechanisms 50.

Another Embodiment 2

Figure 12:
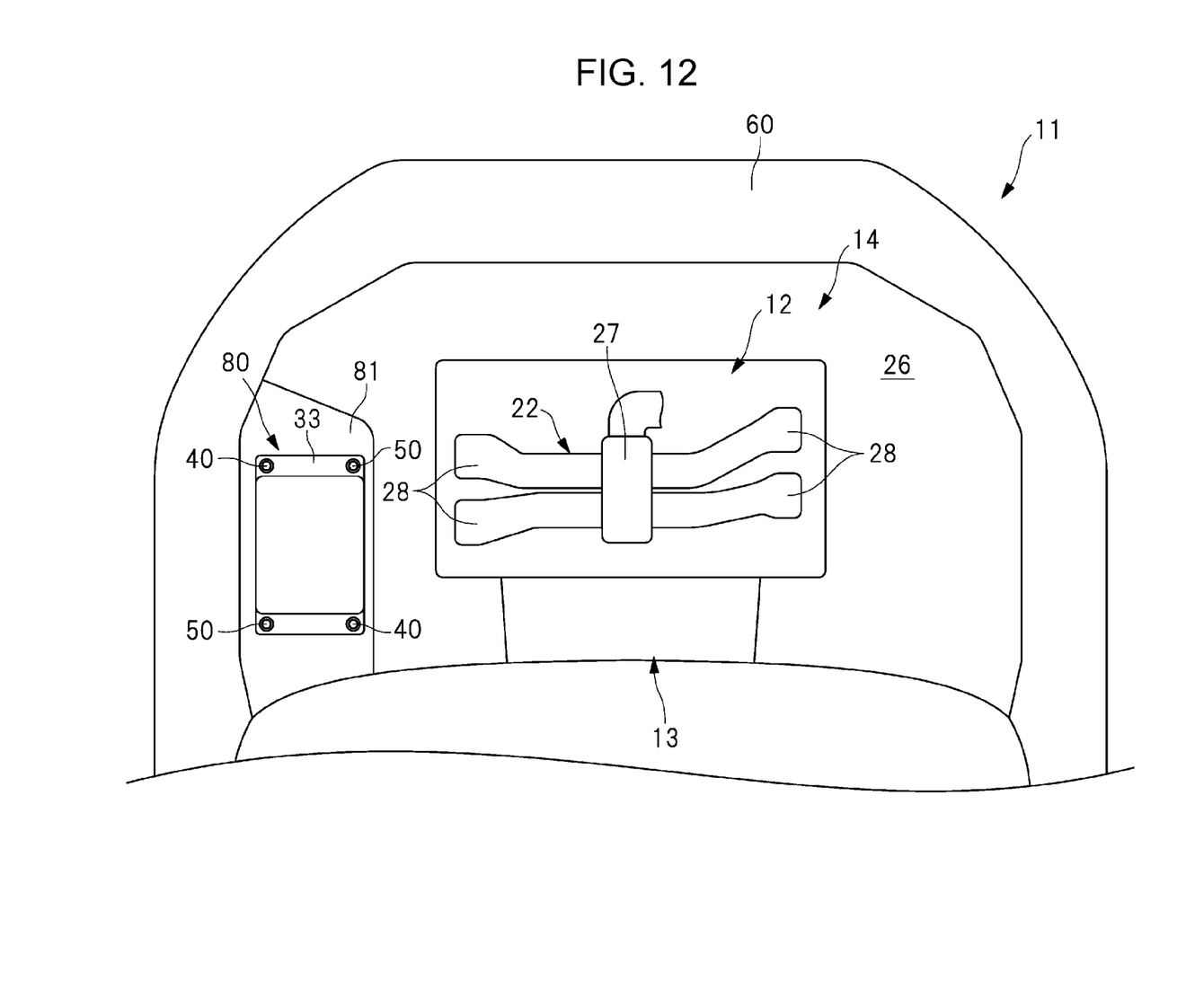
FIG. 12 illustrates a device attachment structure according to another embodiment of the disclosure.

According to the above description, the power conversion unit 23 is attached to the engine 12. However, the structure is not limited to this, and the power conversion unit 23 may be attached to other vehicle members. FIG. 12 illustrates a device attachment structure 80 according to another embodiment of the disclosure. In FIG. 12, the device attachment structure 80 is disposed in an engine room 26. As illustrated in FIG. 12, a vehicle body bracket (vehicle member) 81 that is fixed to a vehicle body 60 is provided in the engine room 26, and a device bracket 33 is attached to a power conversion unit 23. The vehicle body bracket 81 and the device bracket 33 are fastened together by using first attachment mechanisms 40 and second attachment mechanisms 50. Also, when the power conversion unit 23 is attached to the vehicle body 60 as in this example, first and second bushings 42 and 52 are prevented from falling off the device bracket 33 together. Accordingly, falling of the device bracket 33, that is, falling of the power conversion unit 23, can be prevented.

Another Embodiment 3

Figure 13:
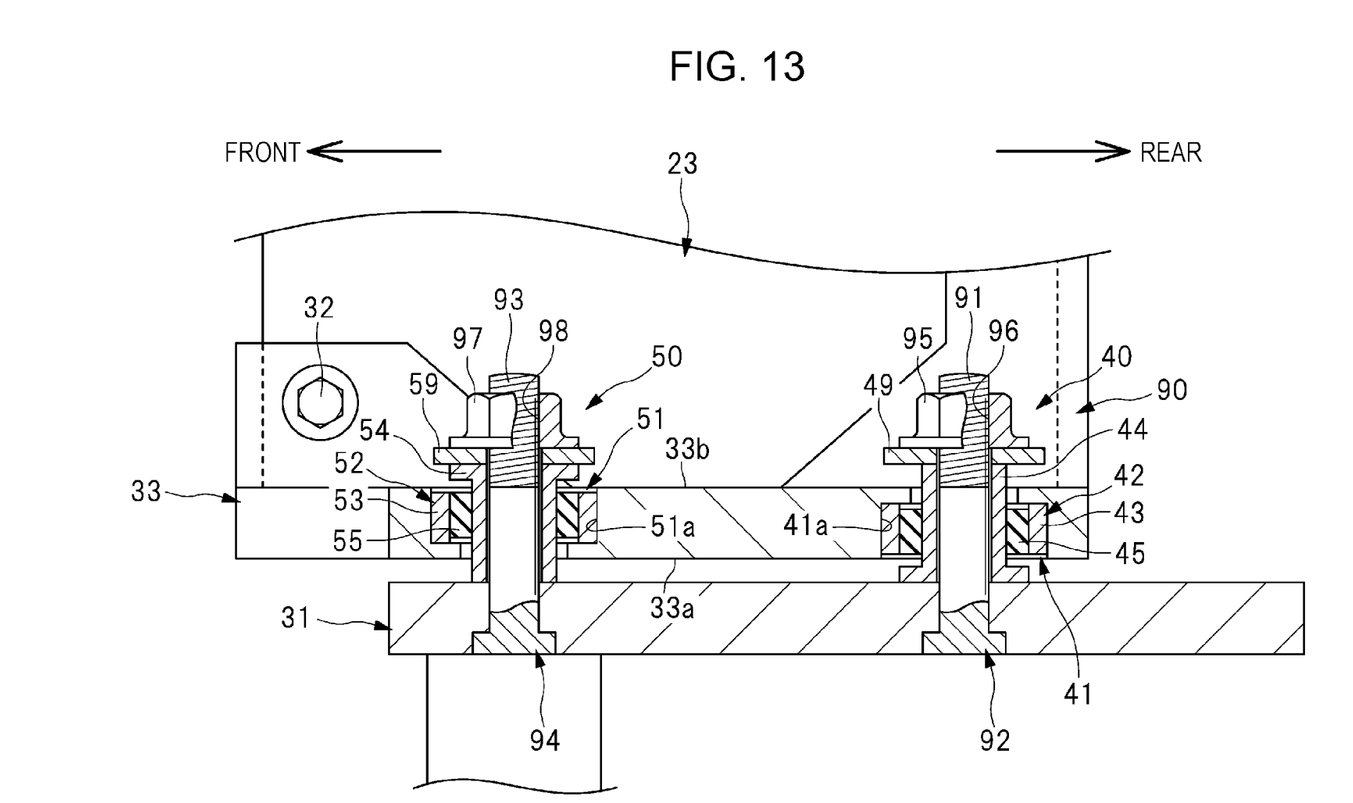
FIG. 13 illustrates a device attachment structure according to another embodiment of the disclosure.

In the example illustrated in FIG. 5, the fastening bolts 48 and 58 are respectively screwed into the internal threads 46 and 56 in an engine bracket 31. However, the structure is not limited to this. FIG. 13 illustrates a device attachment structure 90 according to another embodiment of the disclosure. FIG. 13 illustrates a region similar to that illustrated in FIG. 5. As illustrated in FIG. 13, a stud bolt 92 having an external thread (first thread) 91 and a stud bolt 94 having an external thread (second thread) 93 are fixed to the engine bracket 31. Since the stud bolts 92 and 94 are fixed to the engine bracket 31, the engine bracket 31 is provided with the external threads 91 and 93. A device bracket 33 of a power conversion unit 23 is placed on the above-described engine bracket 31 such that the stud bolt 92 is inserted through a first through hole 41 and that the stud bolt 94 is inserted through a second through hole 51.

Then, an internal thread 96 of a first fastening nut (first fastener) 95 is screwed onto the external thread 91 of the stud bolt 92. Thus, a first inner sleeve 44 of a first bushing 42 is fastened to the engine bracket 31 by the first fastening nut 95. Similarly, an internal thread 98 of a second fastening nut (second fastener) 97 is screwed onto the external thread 93 of the stud bolt 94. Thus, a second inner sleeve 54 of a second bushing 52 is fastened to the engine bracket 31 by the second fastening nut 97. A first washer 49 is provided between the first fastening nut 95 and the first inner sleeve 44. A second washer 59 is provided between the second fastening nut 97 and the second inner sleeve 54. Also, when the stud bolts 92 and 94 are provided on the engine bracket 31 and the fastening nuts 95 and 97 are screwed onto the stud bolts 92 and 94 as in this example, a function similar to that of the above-described device attachment structure 10 can be obtained.

The disclosure is not limited to the above-described embodiments, and various modifications are possible without departing from the gist of the disclosure. According to the above description, the device attachment structures 10, 70, 80, and 90 are applied to the hybrid vehicle 11 including the engine 12. However, the structure is not limited to this, and the device attachment structures 10, 70, 80, and 90 may be applied to a vehicle having no engine 12, such as an electric automobile. In addition, according to the above description, the power conversion unit 23 is attached to the longitudinal engine 12. However, the structure is not limited to this, and the power conversion unit 23 may be attached to a transverse engine. Alternatively, the power conversion unit 23 may be attached to the transmission 13.

According to the above description, the power conversion unit 23 in which an inverter and a converter are integrated serves as the power conversion device. However, the structure is not limited to this, and the power conversion device may be an inverter. Alternatively, the power conversion device may be a converter or an on-board charger. In the example illustrated in FIG. 8, the nuts 47 and 57 that respectively have the internal threads 46 and 56 are welded to the device bracket 33, which is a device member. However, the structure is not limited to this, and the internal threads 46 and 56 may be formed in the base material of the device bracket 33.

A device attachment structure according to an embodiment includes a device member provided on a power conversion device and having a first through hole and a second through hole. The first through hole in the device member includes a large-diameter space that opens in a first surface and to which a first outer sleeve is fitted. The second through hole in the device member includes a large-diameter space that opens in a second surface and to which a second outer sleeve is fitted. Accordingly, the power conversion device can be appropriately attached to a vehicle.

The invention claimed is:
1. A device attachment structure comprising:
a vehicle member attachable on a vehicle and including a first thread and a second thread;
a device member attachable on a power conversion device and including a first through hole and a second through hole;
a first bushing comprising a first outer sleeve and a first inner sleeve, the first outer sleeve being fitted to the first through hole, the first inner sleeve being coupled to an inner periphery of the first outer sleeve with an elastic body provided between the first inner sleeve and the first outer sleeve;

a second bushing comprising a second outer sleeve and a second inner sleeve, the second outer sleeve being fitted to the second through hole, the second inner sleeve being coupled to an inner periphery of the second outer sleeve with an elastic body provided between the second inner sleeve and the second outer sleeve;

a first fastener attached to the first thread of the vehicle member and configured to fasten the first inner sleeve to the vehicle member; and a second fastener attached to the second thread of the vehicle member and configured to fasten the second inner sleeve to the vehicle member, wherein the device member includes a first surface that faces the vehicle member and a second surface that is opposite to the first surface, wherein the first through hole in the device member has a large-diameter space that opens in the first surface and to which the first outer sleeve is fitted and a small-diameter space that opens in the second surface and through which the first inner sleeve passes, and wherein the second through hole in the device member has a large-diameter space that opens in the second surface and to which the second outer sleeve is fitted and a small-diameter space that opens in the first surface and through which the second inner sleeve passes.

2. The device attachment structure according to claim 1, wherein the device attachment structure comprises:

first attachment mechanisms each comprising the first thread, the first through hole, the first bushing, and the first fastener; and second attachment mechanisms each comprising the second thread, the second through hole, the second bushing, and the second fastener.

3. The device attachment structure according to claim 2, wherein two of the first attachment mechanisms are disposed at a first pair of diagonal corners, and wherein two of the second attachment mechanisms are disposed at a second pair of diagonal corners other than the first pair of diagonal corners.

4. The device attachment structure according to claim 3, wherein a first washer is provided between the first fastener and the first inner sleeve, and wherein a second washer is provided between the second fastener and the second inner sleeve.

5. The device attachment structure according to claim 4, wherein the first thread and the second thread are internal threads, and wherein the first fastener and the second fastener are bolts.

6. The device attachment structure according to claim 3, wherein the first thread and the second thread are internal threads, and wherein the first fastener and the second fastener are bolts.

7. The device attachment structure according to claim 2, wherein a first washer is provided between the first fastener and the first inner sleeve, and wherein a second washer is provided between the second fastener and the second inner sleeve.

8. The device attachment structure according to claim 7, wherein the first thread and the second thread are internal threads, and wherein the first fastener and the second fastener are bolts.

9. The device attachment structure according to claim 2, wherein the first thread and the second thread are internal threads, and wherein the first fastener and the second fastener are bolts.

10. The device attachment structure according to claim 1, wherein a first washer is provided between the first fastener and the first inner sleeve, and wherein a second washer is provided between the second fastener and the second inner sleeve.

11. The device attachment structure according to claim 10, wherein the first thread and the second thread are internal threads, and wherein the first fastener and the second fastener are bolts.

12. The device attachment structure according to claim 1, wherein the first thread and the second thread are internal threads, and wherein the first fastener and the second fastener are bolts.

13. A device attachment system, comprising:

a vehicle;

a power conversion device;

a device attachment structure for attaching the power conversion device to the vehicle, wherein the device attachment structure comprising:

a vehicle member provided on the vehicle and including a first thread and a second thread;

a device member provided on the power conversion device and including a first through hole and a second through hole;

a first bushing comprising a first outer sleeve and a first inner sleeve, the first outer sleeve being fitted to the first through hole, the first inner sleeve being coupled to an inner periphery of the first outer sleeve with an elastic body provided between the first inner sleeve and the first outer sleeve;

a second bushing comprising a second outer sleeve and a second inner sleeve, the second outer sleeve being fitted to the second through hole, the second inner sleeve being coupled to an inner periphery of the second outer sleeve with an elastic body provided between the second inner sleeve and the second outer sleeve;

a first fastener attached to the first thread of the vehicle member and configured to fasten the first inner sleeve to the vehicle member; and a second fastener attached to the second thread of the vehicle member and configured to fasten the second inner sleeve to the vehicle member, wherein the device member includes a first surface that faces the vehicle member and a second surface that is opposite to the first surface, wherein the first through hole in the device member has a large-diameter space that opens in the first surface and to which the first outer sleeve is fitted and a small-diameter space that opens in the second surface and through which the first inner sleeve passes, and wherein the second through hole in the device member has a large-diameter space that opens in the second surface and to which the second outer sleeve is fitted and a small-diameter space that opens in the first surface and through which the second inner sleeve passes.

14. The device attachment system according to claim 13, wherein the device attachment structure comprises:

first attachment mechanisms each comprising the first thread, the first through hole, the first bushing, and the first fastener; and second attachment mechanisms each comprising the second thread, the second through hole, the second bushing, and the second fastener.

15. The device attachment system according to claim 14, wherein two of the first attachment mechanisms are disposed at a first pair of diagonal corners, and
wherein two of the second attachment mechanisms are disposed at a second pair of diagonal corners other than the first pair of diagonal corners.

16. The device attachment system according to claim 13,
wherein a first washer is provided between the first fastener and the first inner sleeve, and
wherein a second washer is provided between the second fastener and the second inner sleeve.

17. The device attachment system according to claim 14,
wherein a first washer is provided between the first fastener and the first inner sleeve, and
wherein a second washer is provided between the second fastener and the second inner sleeve.

18. The device attachment system according to claim 14,
wherein the first thread and the second thread are internal threads, and
wherein the first fastener and the second fastener are bolts.

19. The device attachment system according to claim 15,
wherein a first washer is provided between the first fastener and the first inner sleeve, and
wherein a second washer is provided between the second fastener and the second inner sleeve.

20. The device attachment system according to claim 13,
wherein the first thread and the second thread are internal threads, and
wherein the first fastener and the second fastener are bolts.

* * * * *